United States Patent
Gupta et al.

(10) Patent No.: US 10,447,028 B2
(45) Date of Patent: Oct. 15, 2019

(54) BIPOLE VOLTAGE SOURCE CONVERTER AND CONTROL AND OPERATION THEREOF

(71) Applicant: General Electric Technology GmbH, Baden (CH)

(72) Inventors: Robin Gupta, Stafford (GB); Robert Whitehouse, Stafford (GB); Carl Barker, Stafford (GB)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/563,009

(22) PCT Filed: Mar. 30, 2016

(86) PCT No.: PCT/EP2016/056965
§ 371 (c)(1),
(2) Date: Sep. 29, 2017

(87) PCT Pub. No.: WO2016/156435
PCT Pub. Date: Oct. 6, 2016

(65) Prior Publication Data
US 2018/0366942 A1 Dec. 20, 2018

(30) Foreign Application Priority Data
Mar. 30, 2015 (GB) .................... 1505410.9

(51) Int. Cl.
*H02H 7/12* (2006.01)
*H02J 3/36* (2006.01)
(Continued)

(52) U.S. Cl.
CPC ........ *H02H 7/1216* (2013.01); *H02H 1/0007* (2013.01); *H02J 3/36* (2013.01);
(Continued)

(58) Field of Classification Search
CPC .............................. H02M 7/32; H02H 7/1255
(Continued)

(56) References Cited

U.S. PATENT DOCUMENTS

2009/0219737 A1* 9/2009 Bjorklund ................. H02J 3/36
363/35
2009/0316446 A1* 12/2009 Astrom .................. H02H 7/268
363/35
(Continued)

FOREIGN PATENT DOCUMENTS

| CN | 1877948 A | 12/2006 |
| CN | 102088186 A | 6/2011 |

(Continued)

OTHER PUBLICATIONS

International Search Report and Written Opinion issued in connection with corresponding PCT application No. PCT/EP2016/056965 dated Jun. 8, 2016.
(Continued)

*Primary Examiner* — Gary A Nash
(74) *Attorney, Agent, or Firm* — Eversheds Sutherland (US) LLP

(57) ABSTRACT

A converter apparatus and methods of operation thereof are disclosed. In an example, a converter unit of a bipole converter apparatus comprising a neutral connection having a breaker switch is disclosed. In the event of a DC fault, the fault condition may be monitored and it is determined whether a breaker switch operation condition is met. The breaker switch is opened when the breaker switch operation condition is met. In one example, the breaker switch operation condition may comprise a current level.

12 Claims, 3 Drawing Sheets

(51) Int. Cl.
    *H02H 1/00* (2006.01)
    *H02M 1/32* (2007.01)
    *H02M 5/458* (2006.01)
    *H02M 7/32* (2006.01)
    *H02H 7/125* (2006.01)

(52) U.S. Cl.
    CPC ........... *H02M 1/32* (2013.01); *H02M 5/4585* (2013.01); *H02H 7/1255* (2013.01); *H02M 7/32* (2013.01); *Y02E 60/60* (2013.01)

(58) Field of Classification Search
    USPC ..... 323/275, 276; 363/34, 35, 51–53, 65, 78
    See application file for complete search history.

(56) References Cited

U.S. PATENT DOCUMENTS

2011/0235375 A1* 9/2011 Dommaschk ........ H02H 7/1257
                                                      363/54
2012/0092904 A1* 4/2012 Nuqui ...................... H02J 3/36
                                                      363/35
2012/0201059 A1* 8/2012 Berggren ............... H02H 7/268
                                                      363/53
2012/0228949 A1* 9/2012 Norman ................... H02H 3/16
                                                      307/84

FOREIGN PATENT DOCUMENTS

CN          103022988 A       4/2013
CN          102082432 B       5/2014

OTHER PUBLICATIONS

First Office Action and Search issued in connection with corresponding CN Application No. 201680019882.3 dated Oct. 8, 2018 (English Translation not available).

* cited by examiner

BIPOLE VOLTAGE SOURCE CONVERTER AND CONTROL AND OPERATION THEREOF

FIELD OF THE INVENTION

The present invention relates to converters, and methods of operation thereof.

BACKGROUND OF THE INVENTION

Converters are used to change the voltage level of a power source and/or to transfer power between a Direct Current (DC) and an Alternating Current (AC) connection. Converters are seen in all manner of electronic devices, from low power devices (for example, a battery in a computer may supply a particular voltage, but circuits therein may individually require a different voltage) to High Voltage Direct Current (HVDC) networks. For example, in the developing field of power transmission, it may be desirable to interconnect networks at different voltages, and/or convert from AC to DC or vice versa.

Bipolar converters, which have two connections with opposite polarity, each at a high potential with respect to ground, are known. Some bipolar converters have an advantage over monopole configurations in that, in the event of some faults such as pole-to-ground faults, the other un-faulted pole can remain in service, using either a ground return path or a dedicated neutral conductor as a return path. In such examples, even with one pole is out of service due to a fault, 50% of the capability of a converter may still be available (and with overload capability this can even be higher).

SUMMARY OF THE INVENTION

According to a first aspect of the invention, there is provided a method of operation of a converter unit of a bipole converter apparatus comprising a neutral connection having a breaker switch, the method comprising: monitoring a DC fault condition; determining if a breaker switch operation condition is met; and when the breaker switch operation condition is met, opening the breaker switch.

In such a method, therefore, the breaker switch of the neutral connection (for example a bus connection) is not operated immediately, but on fulfilment of an operation condition. This may reduce the rating requirement for a breaker switch of the neutral bus connection and/or allow a breaker switch of the neutral bus connection to be opened relatively quickly, as further set out below. Such a method may be suitable for use with a converter apparatus in which fault current may remain in circulation through the converter for some time after the fault has occurred (for example, in non-fault blocking Voltage Source Converters (VSCs)). A DC fault condition may include a fault condition such as pole-to-ground fault, pole-to-pole fault or double pole-to-ground (a pole-to-pole-to-ground) fault.

In examples, monitoring the fault condition comprises monitoring the current through the breaker switch. In such examples, determining if the breaker switch operation condition is met may comprise determining if the current through the breaker switch is less than a threshold current. This may reduce the rating requirement for a breaker switch of the neutral bus connection and/or ensure that the current to be interrupted is not higher than the current interruption/braking capability of the breaker switch, whilst still allowing relatively rapid operation of the breaker switch of the neutral bus connection.

Determining if the breaker switch operation condition is met may alternatively or additionally comprise determining if the current through the breaker switch is decreasing. As will be familiar to the skilled person, when a fault occurs, the current in a converter apparatus may initially increase before, in some examples, levelling out to become approximately constant for a period. An AC breaker is usually operated as soon as possible, and thereafter the current through the converter may start falling. A decreasing current is indicative that AC breaker has opened. Therefore, monitoring for a reducing current may ensure that operation of the breaker switch occurs after the AC breakers have been opened.

In some examples, both a threshold current and a decreasing current may be required before the breaker switch operation condition is met. This may prevent the breaker switch from being operated too early. If for example, the breaker switch operation condition is related solely to the current through the breaker switch being less than a threshold, for example $I_{limit}$, it may be possible that current I<Limit is seen during the period of increasing current. If the breaker switch operation condition also requires that the current is falling, this may ensure that the switch opens only after an AC breaker has opened, which may in turn reduce the required energy rating of the breaker switch of the neutral bus connection.

In some examples, determining if the breaker switch operation condition is met comprises determining if a predetermined time has elapsed since the fault occurred. The time may be predetermined based on a determination of the likely current, or the maximum current, which may be carried by the breaker switch once the predetermined time has elapsed. Such a method may be simple in operation as it does not require current monitoring.

According to a second aspect of the invention, there is provided a bipole voltage source converter (VSC) apparatus comprising a controller and a plurality of converter units arranged to convert power between an alternating current and a direct current, each converter unit having DC connections to a pole of a DC link and a neutral connection, wherein the neutral connection comprises a breaker switch, the controller being arranged to detect a DC fault, to monitor a fault condition and to open the breaker switch of a neutral connection when a breaker switch operation condition is met.

As the breaker switch is not controlled to open immediately but instead requires fulfilment of a breaker switch operation condition, this may allow any fault current to decay before operation of the switch, which in turn allows a switch with a lower fault current breaking capability than would otherwise be the case to be used as the breaker switch of the neutral bus connection. Detection of a fault may comprise receiving an indication of a fault condition.

In one example, the controller is arranged to determine that the fault is a fault associated with one of the poles of the DC link and to open a breaker switch in the neutral connection of the converter units connected to the faulty pole. Such VSC apparatus may be further arranged, once the breaker switch(es) of a neutral connection of the pole having a fault are open, to operate the converter units of the pole not having a fault in a monopole configuration. This allows the VSC apparatus to continue to provide power transfer capability. In another example (which may be, for example, in the case of a pole-to-pole fault or a pole-to-pole-to-ground fault), the VSC apparatus may be shut down and be restarted after fault clearing. In such an example, fault clearing may comprise opening of all neutral connection breaker switches.

In some examples, the controller may be arranged to receive an indication of the current through at least one breaker switch of a neutral connection. In such examples, the breaker switch operation condition may comprise a determination that the current is below a threshold current and/or a determination that the current through the at least one breaker switch of a neutral connection is falling. In other examples, the breaker switch operation condition may comprise a determination that a predetermined time has elapsed since the fault condition was detected.

In some examples, the converter units are non-fault blocking converter units, for example comprising two-level voltage source converters or multi modular converters having a half-bridge design. In such converter units, fault current may continue to flow through converter unit diodes, even after blocking the converter unit. Fault current contribution from connected AC network may be prevented or stopped by opening an AC breaker. However, even after the AC breaker is opened, some fault current may continue to flow through converter unit diodes due to inductances within the converter unit circuitry and/or some current may also flow from converter units connected to non-faulted pole. Thus, delaying operation of breaker switch may be of particular benefit in such apparatus as it may reduce the rating requirement for the breaker switches.

According to a third aspect of the invention, there is provided a converter unit comprising a controller and having DC connections for connection to a pole of a DC link and to a neutral connection, wherein the neutral connection comprises a breaker switch, the controller being arranged to detect a DC fault, to monitor a fault condition and to open the breaker switch of a neutral connection when a breaker switch operation condition is met.

The converter unit may be for use in a bipole voltage source converter apparatus having a plurality of converter units arranged to convert power between an alternating current and a direct current.

The method of the first aspect of the invention may comprise a method of operating a converter apparatus comprising a plurality of converter units.

Further aspects of the invention comprise a method of use of the converter apparatus and the converter unit.

Features described in relation to one aspect of the invention may be combined with those of another aspect of the invention. In particular, the converter unit may have any of the features of any of the converter units described in relation to the converter apparatus. The method of the first aspect of the invention may be a method of controlling the converter unit of the third aspect, or a converter apparatus of the second aspect, and/or may be carried out by a controller thereof.

Embodiments of the in the invention are now described, by way of example only, with reference to the following Figures.

DETAILED DESCRIPTION

Figure 1:
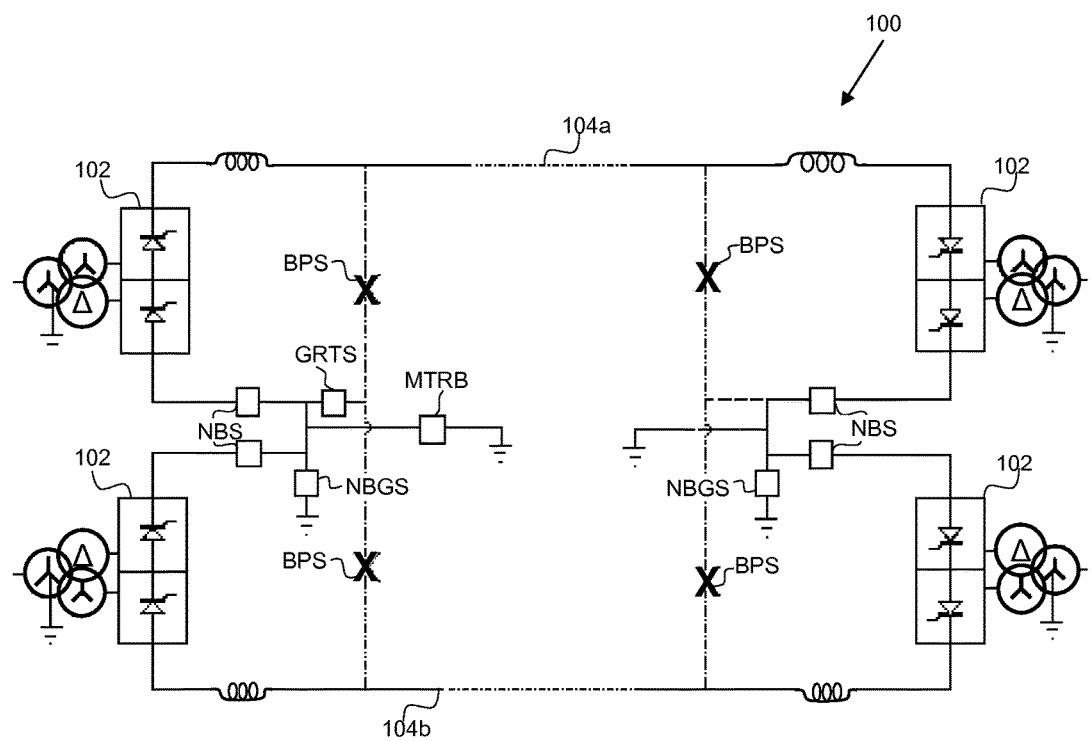
FIG. 1 shows a schematic representation of a bipolar Line Commutated Converter.

FIG. 1 shows a prior art example of a bipolar Line Commutated Converter (LCC) system 100 comprising a plurality of valves 102 connected between a first 104A and second 104B DC pole connection. The valves 102 are unidirectional, i.e. they can (depending on the switching position of switching apparatus) conduct current in a first direction but not in the opposed direction. The valves 102 have neutral buses connecting to a neutral (ground) connection.

FIG. 1 shows various DC side switches. A Neutral Bus Switch (NBS) is provided in each of the connections to a neutral bus. Also provided are a Metallic Return Transfer Breaker (MRTB), a Ground Return Transfer Switch (GRTS) (both of which are capable of transferring rated DC current), Neutral Bus Ground Switches (NBGS) and a number of bypass switches (BPS) which may be operated to provide the metallic return path.

In the event of a pole-to-ground fault on one pole, the valves 102 associated with that pole are blocked, such that they cannot carry current in either direction. However, it may be desirable to continue to operate the LCC system 100, and in such cases the valves 102 connected to the unfaulted pole may remain in service and the system 100 may be reconfigured for monopole operation. A system 100 in a monopole configuration may operate either with a ground return or through a dedicated metallic return.

Reconfiguration of the system 100 into a monopole configuration will be familiar to the skilled person. However, it is noted that, in order to prevent DC current being directed to the fault via the neutral connection (which is common to both poles), Neutral Bus Switches (NBS) (which are closed in normal operation) of a valve 102 connected to a faulty pole may be opened. Although the fault current breaking capability rating of the NBS is generally relatively low, the signal to open the NBS may be sent substantially simultaneously with the blocking of a converter valve 102 as the current in the system 100 is quashed almost instantaneously as the valves 102 are blocked, even if the system remains connected to the AC network (i.e. without opening the AC breaker(s)).

Bipolar Voltage Source Converters (VSCs), for example Multilevel Modular Converter (MMCs) or two-level VSCs, have certain advantages with respect to LCCs (for example, having good reactive power control, being able to operate in islanding mode and allowing a smaller overall footprint for a converter station) but not all VSC designs are capable of fault blocking.

Figure 2:
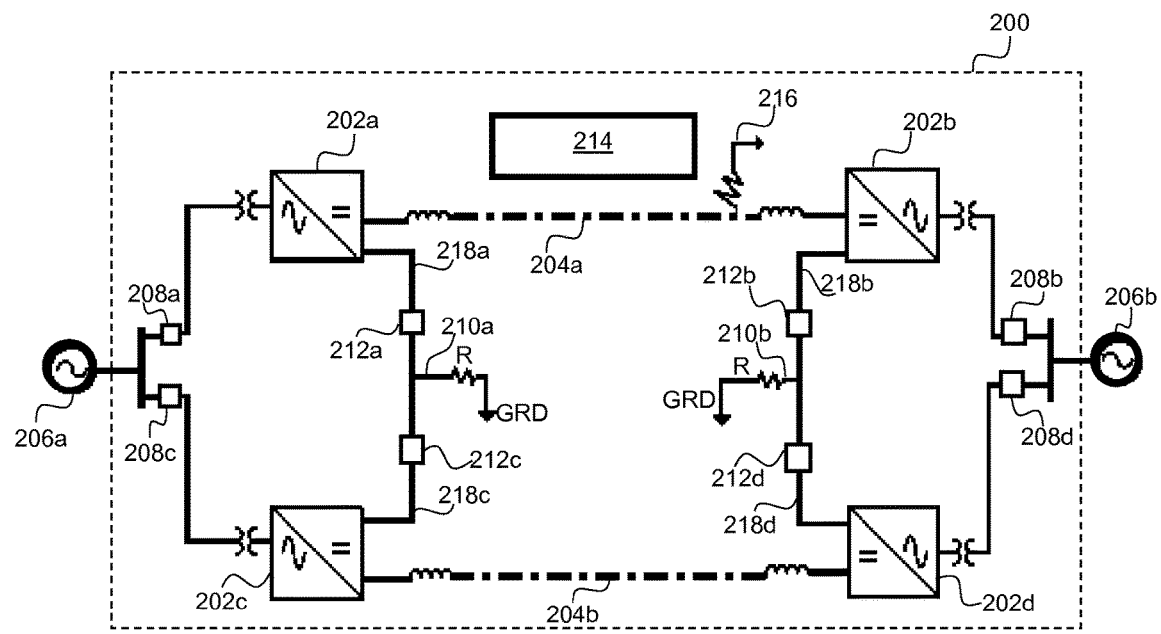
FIG. 2 shows a schematic representation of a bipolar Voltage Source Converter.

FIG. 2 shows an example of a VSC apparatus 200 comprising a plurality of converter units 202A-D. Each converter unit 202 has an AC side and a DC side. On the DC side, there is a connection to a DC pole connection 204A, B and a neutral connection 218A-D to a neutral bus 210A, B, which may be connected to ground or connected through a dedicated metallic conductor. The DC pole connections 204A, B together form a DC link between the converter units 202. In normal (i.e. non-fault) operation of the apparatus 200, there will generally be limited, or no, current present on either neutral bus 210.

A first pair of converter units 202A, B is associated with a first pole and connected to a first pole connection 204A. A second pair of converter units 202C, d is associated with a second pole and connected to a second pole connection 204B. The apparatus 200 is arranged between a first 206A and second 206B AC network. One converter unit 202 from a pair is arranged to convert AC power from one of the networks 206 to DC, which is transmitted over the associated pole connection 204, and the other converter unit 202 of the same pair is to convert the DC power to AC and to connect to the other of the AC networks 206. The VCS apparatus 200 may be bi-directional (i.e. power can be exchanged between the networks 206 in either direction).

It will be appreciated that the apparatus 200 may be situated in one, or several, locations. In some examples, the DC connections 204A, b may be many miles long and the converter units 202 of a pair may be separated by a considerable distance.

AC breakers 208A-D are arranged between the AC networks 206 and the converter units 202. Each converter unit 202 is connected to a neutral bus 210a, b via a breaker switch, in this example a neutral bus switch 212A-D in a neutral connection 218A-D of a converter unit 202. The neutral bus switches 212A-D are DC switches, and could comprise any suitable switch design such as a resonant switch, one or more semiconductor switch(es), an active switch, a passive switch, fast operating solid state/hybrid HVDC breakers etc. The connection to ground GRD has a resistance R characterised by the resistance of the electrode line and the electrode line to remote earth (although in other examples, the converter apparatus 200 may also have a dedicated conductor for return path for monopole operation).

The apparatus 200 further comprises a controller 214, arranged to receive an indication of current through different parts of the apparatus 200 from current monitors (not shown), and to control the apparatus 200, in particular the switches thereof. In other examples, more than one controller may be provided. In one example, a plurality of controllers may be provided, each operating to control one or more components. For example, each converter unit 202A-D and each neutral bus switch 212A-D may be controlled by a separate controller or a converter unit 202 and the associated neutral bus switch 212 may be controlled by a common controller, etc. Such controllers may be spatially separated from one another.

Although not illustrated herein, the VSC apparatus 200 may comprise additional elements, for example additional DC switches, which may for example comprise any or all of the switches described in relation to FIG. 1.

Figure 3:
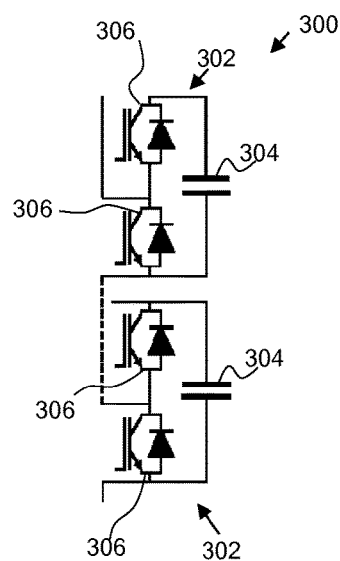
FIG. 3 shows a schematic representation of a stack of converter sub-modules.

The converter units 202A-D in this example, and as shown in FIG. 3, each comprise at least one stack 300 of a plurality sub-modules 302 having a half-bridge design. Such a design will be familiar to the skilled person from Multi Modular Converters (MMCs). Each stack 300 of sub-modules 302 is arranged to synthesise a desired voltage. Each sub-module 302 comprises an energy storage means (in this example, a capacitor 304), which can be inserted into the circuit, blocked or bypassed in order to approximate/convert an AC voltage according to the switching state of a number of switching elements 306.

Each sub-module 302 comprises two switching elements 306, each switching element comprising a semiconductor device (which in this example is an Integrated Gate Bipolar Transistor (IGBT)) and an anti-parallel uni-directional current device, in this example a diode. It will therefore be appreciated that although a stack 300 can block current in a first direction by operation of the semiconductor device, it cannot block current in the opposed direction as such current can be conducted via the diodes. As such, a converter unit 202 based on a half-bridge sub-module is an example of a non-fault blocking converter unit 202. Other examples of non-fault blocking converters are two level VSCs or multi-level converters such as neutral point clamped VSC converters.

A stack 300 may comprise any number of such sub-modules 302, typically up to several hundred. In a converter unit 202, there may be one stack 300 for each phase of the AC power.

Such a multi modular design is capable of accurately synthesising voltages and can demonstrate good harmonic performance when compared to an LCC or the like. The use of a half bridge sub-module design (instead of, for example, a full bridge sub-module design) may be preferred as the component count is relatively low and, as the half-bridge design has fewer switches, it operates with lower switching losses. However, unlike full-bridge sub-modules, half-bridge sub-modules are not capable of fault blocking as, as noted above, they are not capable of blocking current in both directions.

Figure 4:
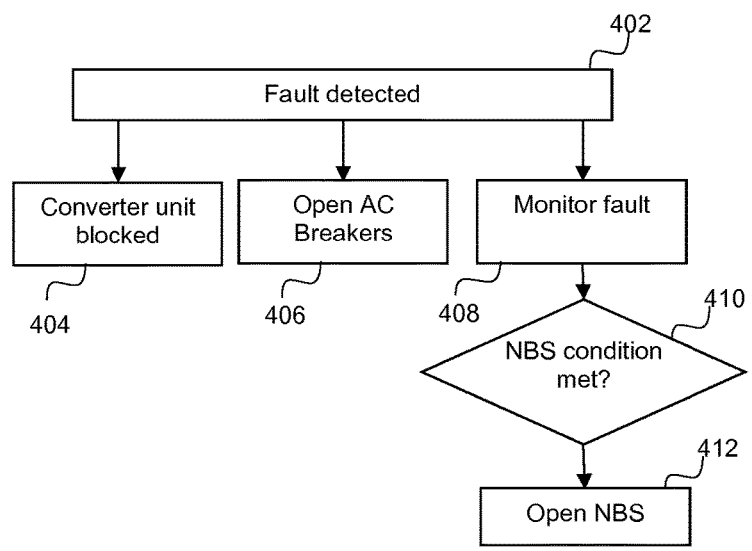
FIG. 4 shows a flowchart showing steps in a method of controlling a bipolar Voltage Source Converter.

For the purposes of example, the apparatus 200 may develop a pole to ground fault 216 in the first pole. Operation of the apparatus 200 or a unit 202 thereof in response to a fault condition is now described with reference to the flowchart of FIG. 4.

In block 402, a fault is detected, in this example when the controller 214 receives an indication of current which exceeds a threshold level. In this example, the controller 214 then controls the apparatus 200 such that the converter units 202A, 202B of the first pair (i.e. those converter units 202 associated with the faulted pole) are blocked (block 404). As will be familiar to the skilled person, this may comprise controlling switches within the sub-modules 302 to place each sub-module 302 into a blocked state.

Substantially simultaneously with the command to block the converter units 202A, B, the controller 214 sends an open command to AC breakers 208A, 208B of the converter units 202A, 202B connected to the faulted first pole (block 406).

However, as described above, a blocked sub-module 302, and indeed in this example a blocked converter unit 202 as a whole, can still conduct current in one direction, while blocking current in the opposed direction. Therefore, fault current may continue to flow from an AC network 206A and 206B, through the diodes in the valves of converter units 202A and 202B to the fault. Once the AC breakers 208A, 208B are opened, this fault current starts to fall, but current continues to flow though these diodes as energy remains in converter unit inductances. The fault current may also flow through the converter units 202C and 202D, and then through neutral connections 218 and the diodes of the converter units 202A and 202B to the fault. Therefore, the neutral bus switches 212A, B of the faulted poles should be opened as soon as possible to interrupt this fault current, and such that the apparatus 200 may be operated in a monopole configuration or restarted. However, there may initially be a high current flowing through the neutral bus switches 212A, B.

If the neutral bus switches 212A, B were to be opened immediately, as is the practice in LCCs, they would therefore need to have high fault current breaking capability, which in turn is usually associated with a high cost.

However, in this example, in block 408, the fault condition is monitored. In some embodiments, this monitoring step may comprise monitoring the time since the fault occurred. In another example, as is further described with reference to FIG. 5 below, the monitoring comprises monitoring the current though each neutral bus switch 212A, B. This may comprise monitoring the current anywhere on the neutral connection 218.

When it is determined, in block 410, that a neutral bus breaker switch operation condition is met (this may for example be that a predetermined time has passed and/or that the current through the switch 212 has fallen below a threshold level and/or some other condition), the controller 214 sends an open command to the neutral bus switch 212 (block 412).

Figure 5:
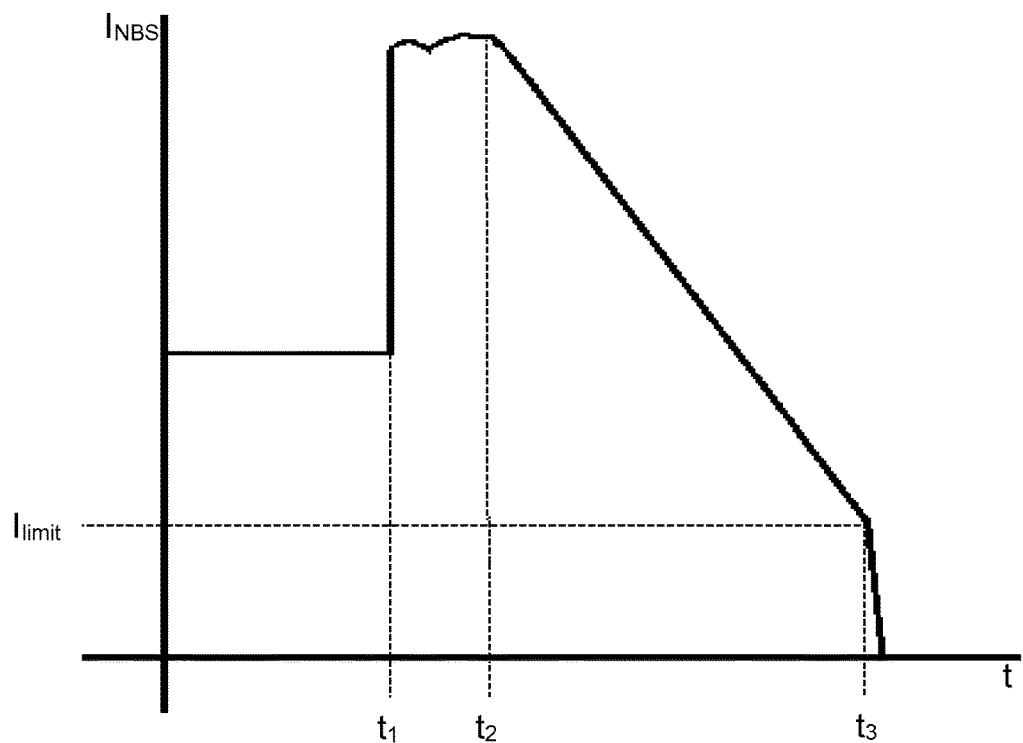
FIG. 5 shows a graph of the current through a switch of a bipolar Voltage Source Converter following a fault.

FIG. 5 shows the current INBs passing though a neutral bus switch 212 against time t. At time $t_1$, a fault occurs. A high DC current is seen through a neutral bus switch 212A, B. However, at time $t_2$, the AC breaker is fully open and the current INBs begins to fall. The time period between $t_1$ and $t_2$ may be of the order of two or three AC cycles, i.e. the time it takes for the AC breaker (which is usually a mechanical breaker) to fully open. In the example of the figures, some oscillation is seen in the current over this period due to some transients or resonance within the apparatus 200 although this may not be seen in all converter designs.

After $t_2$, the current $I_{NBS}$ begins to decay relatively rapidly with a time constant proportion to L/R, where L is total inductance of the circuit and R is the resistance. In practical examples, it may take several hundred milliseconds for current to decay to zero under such conditions depending upon L/R time constant of the circuit.

In this example, the neutral bus breaker switch operation condition requires:
(i)

$$\frac{\partial i}{\partial t} < 0$$

(i.e. the fault current is decreasing, indicating that the AC breaker has been opened); and $$I_{NBS} \leq I_{limit} \quad \text{(ii)}$$

Therefore, once the decreasing current reaches a threshold level $I_{limit}$ at time $t_3$, the controller 214 sends an open command to the neutral bus switch 212. In one example, $I_{limit}$ is based on the rated fault current breaking capability of the switch, for example being at or below the specified current limits of operation for the neutral bus switch 212, or at an optimal operating point (for example, this may be around 50%-60% of the rated current of the apparatus 200). In a typical example, the time between $t_1$ and $t_3$ may be on the order of 50-100 ms.

It will be appreciated that the sooner the fault current path can be broken, the sooner the fault can be cleared and the apparatus 200 restarted in a bipole configuration. Full fault clearing requires fault current to fall to zero, then for a deionization period to pass before the converter units 202A, 202B can be restarted such that bipolar operation can be resumed. As is shown in FIG. 5, once the neutral bus switch 212 is open, the fault current contribution flowing through the diodes of converter unit 202A and 202B quickly becomes zero.

As mentioned above, instead of monitoring the current INBS, the breaker switch operation condition may be satisfied by a predetermined time delay. An appropriate time delay may be determined analytically or experimentally, based on a model or an actual apparatus design and may be around 50-100 ms in some examples. It will be appreciated that it is highly desirable that the fault current through a neutral bus switch 212 is not exceeded on operation (i.e. the fault current is not higher than the breaking capability). Therefore, the time delay may be selected such that there is a high level of certainty that the current will have fallen to below the rated fault current breaking capability of the neutral bus switch 212. As such, the time limit may be set conservatively, i.e. relate to the longest reasonable anticipated time delay before INBs falls to the current breaking capability of neutral bus switch 212, or some other operational current. It may therefore be longer than is necessary in other circumstances, and measuring the current may be preferred as it may allow the switch 212 to be operated sooner following a fault than for a predetermined time delay.

As the methods set out herein actively stop current flow through the converter units 202A, B connected to a faulted pole in the event of a fault (rather than allowing this current to decay to zero), the fault clearance time may be reduced.

Consideration of the desired fault clearance time and the cost of a neutral bus switch given its rating may be made and an appropriate combination selected.

In some examples, a suitable value for $I_{limit}$ may be around half the rated current of the apparatus 200. As will be familiar to the skilled person, an energy absorbing element may be associated with the neutral bus switch 212 to absorb energy following operation of the neutral bus switch and such a value will not require an exceptional increase in the energy rating of an energy absorbing element of the neutral bus switch 212.

A switch with a higher fault current breaking capability may be selected for use as the neutral bus switch 212 if rapid fault clearance is a priority. Otherwise, a lower fault current breaking capability may be used at the cost of longer fault clearance time.

While the example described above considered a pole-to-ground fault at one of the pole, the invention may also be used in the event of a pole-to-pole DC fault condition, a pole-to-pole-to-ground fault and/or any other fault condition which requires opening of a neutral bus switch 212.

While the invention has been illustrated and described in detail in the drawings and foregoing description, such illustration and description are to be considered illustrative or exemplary and not restrictive; the invention is not limited to the disclosed embodiments. Features from one embodiment may be combined with features from another embodiment.

The invention has been described with respect to various embodiments. Unless expressly stated otherwise the various features described may be combined together and features from one embodiment may be employed in other embodiments.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of operation of a converter unit of a bipole converter apparatus comprising a neutral connection having a breaker switch, the method comprising:
   monitoring a DC fault condition;
   determining if a breaker switch operation condition is met;
   when the breaker switch operation condition is met, opening the breaker switch associated with the pole of a DC link having the DC fault; and
   once the breaker switch of the neutral connection of the pole having a fault is open, operating a converter unit of the pole not having a fault in a monopole configuration.

2. The method according to claim 1, wherein the step of monitoring the fault condition comprises monitoring the current through the breaker switch.

3. The method according to claim 2, wherein determining if the breaker switch operation condition is met comprises determining if the current through the breaker switch is less than a threshold current.

4. The method according to claim 2, wherein determining if the breaker switch operation condition is met comprises determining if the current through the breaker switch is decreasing.

5. The method according to claim 1, wherein determining if the breaker switch operation condition is met comprises determining if a predetermined time has elapsed since the fault occurred.

6. A bipole voltage source converter apparatus comprising a controller and a plurality of converter units arranged to convert power between an alternating current and a direct current;
   at least one converter unit having a DC connection to a pole of a DC link and to a neutral connection; and
   wherein the neutral connection comprises a breaker switch;
   the controller being arranged to detect a DC fault, to monitor the fault condition and to open the breaker switch of a neutral connection when a breaker switch operation condition is met, the controller being further arranged to determine that the DC fault is a fault associated with one of the poles of the DC link and to open the breaker switches associated with the pole of a DC link having the fault; and the controller being further arranged to, once the breaker switches of the neutral connection of the pole having a fault are open, operate the converter units of the pole not having a fault in a monopole configuration.

7. The bipole voltage source converter apparatus according to claim 6, wherein the controller is arranged to receive an indication of the current through at least one breaker switch of a neutral connection and wherein the breaker switch operation condition comprises a determination that the current is below a threshold current.

8. The bipole voltage source converter apparatus according to claim 6, wherein the breaker switch operation condition comprises a determination that the current through the breaker switch of neutral connection is falling.

9. The bipole voltage source converter apparatus according to claim 6, wherein the breaker switch operation condition comprises a determination that a predetermined time has elapsed since the fault condition was detected.

10. The bipole voltage source converter apparatus according to claim 6, wherein at least one converter unit comprises at least one two-level voltage source converter or at least one multi modular converter having a haft-bridge design.

11. The bipole voltage source converter apparatus according to claim 6, wherein the DC fault is one of a pole-to-ground, a pole-to-pole fault or a pole-to-pole-to-ground fault.

12. A converter unit comprising a controller and having a DC connection for connection to a pole of a DC link and to a neutral connection, wherein the neutral connection comprises a breaker switch, the controller being arranged to detect a DC fault, to monitor a fault condition and to open the breaker switch of a neutral connection when a breaker switch operation condition is met, the converter unit being a non-fault blocking converter unit.

* * * * *